United States Patent [19]

Bockrath et al.

[11] Patent Number: 5,243,024

[45] Date of Patent: * Sep. 7, 1993

[54] HIGH MODULI POLYIMIDES

[75] Inventors: Ronald E. Bockrath, Oswego; Edward J. Gordon, Evanston, both of Ill.

[73] Assignee: Amoco Corporation, Chicago, Ill.

[ * ] Notice: The portion of the term of this patent subsequent to Nov. 13, 2007 has been disclaimed.

[21] Appl. No.: 633,069

[22] Filed: Dec. 21, 1990

[51] Int. Cl.$^5$ .................. C08G 73/14; C08G 69/26; C08G 8/02

[52] U.S. Cl. .................. 528/353; 528/125; 528/126; 528/128; 528/170; 528/171; 528/173; 528/174; 528/179; 528/185; 528/188; 528/220; 528/229; 528/332; 528/350; 528/352; 525/432; 524/600

[58] Field of Search .......... 528/353, 350, 352, 125, 528/126, 128, 170, 171, 173, 174, 188, 179, 185, 189, 220, 229, 332; 525/432; 524/600

[56] References Cited

U.S. PATENT DOCUMENTS

| | | | |
|---|---|---|---|
| 3,781,249 | 12/1973 | Lubowitz | 528/352 |
| 3,920,612 | 11/1975 | Stephens | 528/188 |
| 3,979,350 | 9/1976 | Winter | 528/125 |
| 4,017,459 | 4/1977 | Onder | 528/170 |
| 4,048,144 | 9/1977 | Stephens | 528/188 |
| 4,111,906 | 9/1978 | Jones | 528/185 |
| 4,167,620 | 9/1979 | Chen | 528/188 |
| 4,448,957 | 5/1984 | Nagaoka | 528/351 |
| 4,535,101 | 8/1985 | Lee | 528/185 |
| 4,755,585 | 7/1988 | Hanson | 528/185 |
| 4,778,872 | 10/1988 | Sasaki | 528/176 |
| 4,837,300 | 6/1989 | St. Clair | 528/125 |
| 4,895,972 | 1/1990 | Stoakley | 528/125 |
| 4,923,960 | 5/1990 | Chen | 528/353 |
| 4,925,916 | 5/1990 | Harris et al. | 528/353 |
| 4,931,540 | 6/1990 | Mueller | 528/353 |
| 4,954,609 | 9/1990 | Vora | 528/125 |
| 4,956,450 | 9/1990 | Lee | 528/125 |
| 4,962,183 | 10/1990 | Chen | 528/125 |
| 4,970,292 | 11/1990 | Bockrath | 528/125 |
| 5,081,229 | 1/1992 | Akahori | 528/353 |

*Primary Examiner*—Morton Foelak
*Assistant Examiner*—P. Hampton-Hightower
*Attorney, Agent, or Firm*—Richard J. Schlott; Stephen L. Hensley; Frank J. Sroka

[57] ABSTRACT

Improved imide-containing copolymers comprising, in the aromatic diamine component, p-phenylene diamine and at least one additional aromatic diamine have increased rigidity and useful processability. The copolymers of this invention also may exhibit improved resistance to the detrimental effects of humid environments and retain mechanical properties at elevated temperatures after exposure to humid environments.

13 Claims, No Drawings

HIGH MODULI POLYIMIDES

BACKGROUND OF THE INVENTION

This invention relates to imide-containing copolymers having improved rigidity, and more particularly to a method for improving the rigidity, water absorption characteristics and environmental resistance of imide-containing polymers. Still more particularly, the method of this invention provides imide-containing copolymers having increased rigidity and good retention of mechanical properties at elevated temperatures after exposure to humid environments.

Polyimides and amide-imide polymers are condensation polymers finding use in a wide range of applications such as adhesives, molding compositions, fibers, films, composites, laminates, etc., owing to a desirable combination of properties. Torlon ® polyamide-imides, available from Amoco Performance Products, Inc., are examples of commercial polyamide-imides, while polyimides are available from a variety of commercial sources.

Despite the many desirable properties of such polymers, their utility in certain applications has been limited by moisture sensitivity, leading to loss of mechanical properties on exposure to high temperatures. In addition, many such polymers, when used as molding resins, do not attain a high level of mechanical properties without additional thermal tempering or similar post treatment of the molded article. So-called annealing or postcuring treatments of polyimide and of polyamide-imide or polyamide-amic acid fabricated parts such as are disclosed in commonly assigned U.S. Pat. No. 4,167,620 allow water liberated due to imidization and chain extension reactions as well as absorbed moisture to diffuse out of fabricated parts and may improve retention of mechanical properties. However, since polyimides and polyamide-imide resins tend to absorb water when exposed to humid environments, these treatments are not sufficient to permit the use of currently available, commercial polyimides and polyamide-imides in certain demanding applications. It is also known to add certain metal oxides to polyimides and polyamide-imides to tie up absorbed moisture as well as water liberated during imidization and chain extension reactions to avoid cracking and sacrifices in physical properties. Again, however, this approach does not yield sufficient improvement of presently available materials or prevent subsequent moisture absorption and further reduction in mechanical properties.

Although aromatic polyimides typically do not absorb water to as great an extent as polyamide-imides, the retention of physical properties on exposure to humid environments remains a potential problem for these materials. Moreover, the utility of aromatic polyimides, particularly for use as molding resins, is limited because their high glass transition temperatures ("Tg") may make melt processing impractical or even impossible.

U.S. Pat. No. 4,017,459, assigned to the Upjohn Company, discloses amide-imide polymers and copolymers prepared from 2,2-bis(4-(p-aminophenoxy)phenyl) propane and trimellitic anhydride halide or from 2,2-bis(4-(p-isocyanatophenoxy)phenyl) propane and trimellitic acid or anhydride. According to the patent, such polyamide-imides are melt processable, such as by injection molding, and useful in manufacture of articles such as gears, ratchets, clutch linings, bearings, pistons and cams and electrical components. In contrast, the patentee teaches that polyamides prepared from the above-named diamine and isophthalic acid, and polyimides prepared from that diamine and pyromellitic acid dianhydride or benzophenone tetracarboxylic acid dianhydride are intractable in the sense of lacking sufficient solubility for solution processing, lacking in melt processability or lacking both.

U.S. Pat. No. 4,111,906 and 4,203,922, both assigned to TRW, Inc., disclose that although processability of polyimides can be improved by using the same in predominantly polyamide-amic acid form and imidizing during a final fabrication step, such an approach is disadvantageous because voids in the final products result from water liberated due to the imidization reaction. These patents also state that chemical and thermal stability are improved by preparing polyimides from 2,2-bis(4-(p-aminophenoxy)phenyl) hexafluoropropane. According to the '906 patent, polyimides prepared from this diamine and a dianhydride are useful as coatings, adhesives and as a matrix for laminated glass or graphite structures. Polyimide foams prepared from pyromellitic acid dianhydride or other aromatic tetracarboxylic acid dianhydrides and such diamine in combination with a second aromatic diamine are disclosed in U.S. Pat. No. 4,535,101, assigned to Imi-Tech Corporation. Preparation of polyamides from the above-named diamine and diacids also is disclosed in the '906 patent. The abstracts of both the '906 and '922 patents mention polyamide-imides; however, no additional information is provided.

U.S. Pat. No. 4,340,697, assigned to Toray Industries, Inc., discloses melt processing difficulties with polyamide-imides and purports to remedy the same by blending with polyphenylene sulfide, polyamide, aromatic polyester, polyphenylene ether or a phenoxy resin. According to this patent, polyamide-imides may contain, in addition to a repeating, main structural amide-imide unit, up to 50 mole percent amide or imide units, the latter being introduced into the polymer by replacing a portion of the aromatic tricarboxylic acid component with pyromellitic acid dianhydride or benzophenone tetracarboxylic acid dianhydride.

U.S. Pat. No. 4,599,383, assigned to NTN-Rulon Industries Co., Ltd. discloses compositions having improved water absorption properties containing a polyamide-imide resin in combination with a polyetherimide and a fluoro resin component.

U.S. Pat. No. 4,755,585, assigned to M & T Chemicals, Inc., discloses polyimides, polyamide acids, polyamide-imides, polyesterimides and polyesteramides containing at least 10 mole percent of a reaction product of an aromatic or aliphatic mono- or dianhydride and certain aromatic diamines having an unsubstituted or halogen- or hydrocarbyl-substituted, p-phenylene radical linked by like or different alkylene, alkenylene, sulfide or oxy groups to two unsubstituted or halogen- or hydrocarbyl-substituted, monovalent, aminophenyl radicals provided that the linking groups are not contemporaneously both sulfide or oxy. Such products are said to exhibit improved processing characteristics and thermal stability and to have utility in widespread applications. Two polyamide-imides and films thereof are demonstrated in the examples. Numerous anhydrides, dianhydrides and diamines are named in this publication and mixtures of anhydrides and dianhydrides are mentioned. It is also reported that mixtures of the above-described diamines with other diamines may be used. Interestingly, such other diamines are said to include 2,2-bis(4-(p-aminophenoxy)phenyl) propane and the corresponding sulfone, although the publication also mentions, with supporting citations, that polyimides prepared from such diamines and dianhydrides are insoluble and that polyamide-imides prepared from such diamines are of uncertain solubility and processability.

As shown by the patents discussed above, a great many polyamide-imides and polyimides are known. Although some resins, particularly polyimides, are known to have a high level of rigidity as reflected by the resin modulus, such resins tend to be quite intractable. More readily processable and tractable prior art polyimide and amide-imide polymers tend to have a greater ductility and flexibility and generally exhibit reduced rigidity, limiting their desirability for use in many more demanding applications requiring rigid, high modulus matrix resins that retain these characteristics after exposure to humid environments, and particularly at elevated temperatures, such as in structural composites.

A method for providing highly-rigid imide-containing resins that are readily processable and exhibit good moldability would be a useful advance in the art. Such resins, and particularly those which retain mechanical properties at elevated temperatures after exposure to humid environments, would find wide application in the form of composite materials and filled molding compounds as well as in neat resin form. Such resins would be useful in a variety of applications including, for example, electrically insulating molded goods and wire coatings, sporting goods and under-the-hood automotive components as well as for producing structural components for sports equipment, automobiles, buildings and aircraft.

SUMMARY OF THE INVENTION

This invention is directed to imide-containing copolymers having increased rigidity and to a method for improving the rigidity of imide-containing copolymers while retaining useful processability. The copolymers of this invention also may exhibit improved resistance to the detrimental effects of humid environments and retain mechanical properties at elevated temperatures after exposure to humid environments. More particularly, the improved imide-containing copolymers of this invention will comprise, in the aromatic diamine component, p-phenylene diamine and at least one additional aromatic diamine. Still more particularly, the aromatic diamine component of the imide-containing copolymers of this invention will preferably comprise from 10 to 90 mole%, more preferably from 10 to 70 mole%, p-phenylene diamine.

The improved copolymers of this invention have a greater rigidity as determined by tensile modulus than the corresponding polymer without the p-phenylene diamine component, and yet surprisingly generally exhibit a lowered Tg. The improved copolymers are moisture-resistant, thermally stable polymeric compositions having excellent mechanical, thermal and chemical properties, are suitable for molding or other thermal processing and may be fabricated by solution processes. They are particularly suited for use in preparing composite structures with excellent compressive strength and rigidity, and filled or unfilled compositions comprising the invented resins may be used for producing high strength molded articles as well as for high strength binders, adhesives and coatings for various materials or substrates.

DESCRIPTION OF THE INVENTION

Briefly, the imide-containing copolymers of this invention may comprise imide-imide units, including amic acid precursors thereof, derived from the polymerization of at least one aromatic tetracarboxylic acid compound, at least one polynuclear aromatic diamine and p-phenylene diamine. The imide-containing copolymers may further comprise amide-imide units, including amic acid precursors thereof, the aforesaid amide-imide units derived by including in the polymerization a trimellitic acid component. The imide-containing copolymers of this invention may be comprised essentially of amide-imide units, including amic acid precursors thereof, derived from the polymerization of a trimellitic acid component, at least one polynuclear aromatic diamine and p-phenylene diamine. The aforesaid trimellitic acid component in each instance will comprise at least one trimellitic acid compound.

By the term "amic acid precursors" is meant those amic acid units corresponding to the tetracarboxylic di-imide structure, as follows:

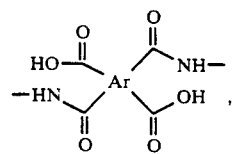

and the amic acid units corresponding to the trimellitamide-imide structure, as follows:

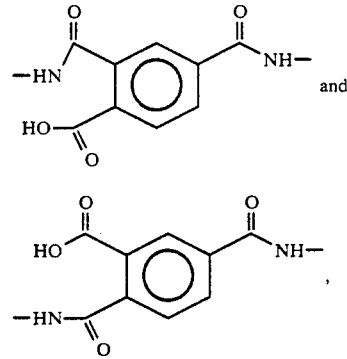

wherein Ar is an aryl radical, including polynuclear aromatic radicals comprising two or more aryl radicals joined by a single carbon-carbon bond or by a bridging group such as an ether group, a sulfone group a keto group, a C1–C4 alkylidene group or the like, with the proviso that the carbonyl carbons of the amide group and carboxylic acid group attached to the same aromatic ring shall be attached to adjacent carbon atoms of the aromatic ring.

Referring to the formulas and the description thereof appearing hereinabove, it will be apparent that imide-containing copolymers of this invention comprise a combination of imide and imidizable amide linkages, and may comprise other amide linkages. By "imidizable amide linkages" is meant those amide linkages ortho to a carboxylic acid group, which are present in the amic acid components. Typically, during melt processing, annealing or curing treatments or other suitable heating, substantial conversion of such imidizable amide linkages to imide form occurs due to reaction of the ortho-disposed amide and carboxyl groups.

Imide-containing polymers are conventionally prepared by a process comprising reacting, in a nitrogen-containing solvent, at least one tetracarboxylic acid compound in which each carboxyl group is ortho to one other carboxyl group and at least one aromatic diamine. Where a copolymer having amide-imide linkages is desired, the reaction mixture will comprise a trimellitic acid component such as trimellitic acid, trimellitic anhydride or its dimer, a trimellitoyl anhydride halide or a combination thereof. Preferably, a combination of 4-trimellitoyl anhydride chloride with trimellitic anhydride is employed because their different reactivities with diamines permit balancing of the proportions of the anhydride and acid chloride relative to each other and to the aromatic tetracarboxylic acid component in such a manner that a high degree of control over polymer inherent viscosities and, accordingly, processability can be achieved.

Thus, even in imide-containing copolymers according to the invention in which high levels of tetracarboxylic acid component-derived units are present, inherent viscosities well suited for further processing can be achieved through the use of higher levels of trimellitic anhydride in the trimellitic acid component. Preferably, when using a combination of 4-trimellitoyl anhydride chloride and trimellitic anhydride, the proportion of anhydride ranges up to about 30 mole% based on total moles of trimellitic acid component and tetracarboxylic acid component. As tetracarboxylic acid component content increases relative to trimellitic acid component content, the proportion of trimellitic anhydride in the combination is preferably increased.

The aryl tetracarboxylic acid component has each carboxyl group ortho-disposed with respect to one other carboxyl group. Any tetracarboxylic compound known in the art for the preparation of imide polymers may be used in the practice of this invention including, for example, pyromellitic dianhydride, diphenyl ether tetracarboxylic acid dianhydride (oxybisphthalic dianhydride), benzophenone tetracarboxylic acid dianhydride, diphenyl sulfone tetracarboxylic acid dianhydride, and the like. Particularly suitable examples include 3,3',4,4'-biphenyl tetracarboxylic acid dianhydride, and 2,2',3,3'-biphenyl tetracarboxylic dianhydride. Mixtures can be employed if desired.

The aromatic diamine component employed for the imide-containing copolymers of this invention will comprise p-phenylene diamine and at least one additional aromatic diamine. Aromatic diamines useful as the additional component in the practice of this invention will have the formula:

H₂N—Ar—NH₂, wherein Ar is a polynuclear aromatic radical. Ar may be further characterized as comprising a plurality of aromatic carbocyclic radicals interconnected by a carbon-carbon bond or a divalent bridging group, such as those aromatic radicals represented by the structures:

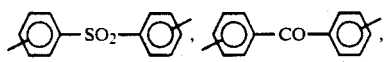

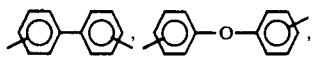

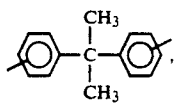

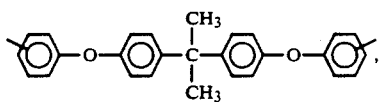

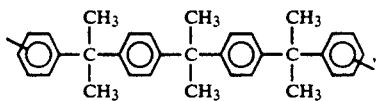

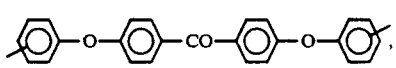

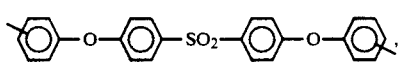

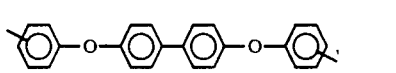

and the like, as well as mixtures thereof.

Suitable diamines include those having a plurality of aromatic rings fused or joined through a stable linkage, including, for example, 4,4'-diaminodiphenyl sulfone, 4,4'-diaminodiphenyl ether or oxy-bis-aniline, 4,4'-bis(aminophenyl) methane, 4,4'-diaminobenzophenone, 2,2-bis(4-(p-aminophenoxy)phenyl) propane, 2,2-bis(3,5-dichloro-4-(p-aminophenoxy)phenyl) propane, 2,2-bis(4-(p-aminophenoxy)phenyl) hexafluoropropane, 2,2-bis(4-(m-aminophenoxy)phenyl) hexafluoropropane, 2,2-bis(4-(m-(aminophenoxy)phenyl) propane, 2,2-bis(4-aminophenoxy)biphenyl, 2,2-bis(4-p-aminophenoxy)phenyl ether, 1,3-bis(3-aminophenoxy)benzene 2,2-bis(4-m-aminophenoxy) benzophenone and the like, as well as combinations thereof.

The diamines may be used singly or in combination, and may further be combined with diamines having a single aromatic nucleus such as m-phenylene diamine, the diaminotoluenes and the like.

To obtain the improvement in mechanical properties and particularly in rigidity, p-phenylene diamine (p-PDA) is an essential amine component. That is, the stoichiometric or near-stoichiometric quantity of diamine employed in producing the imide-containing copolymers of this invention will include from 10 to 90 mole %, preferably from 10 to 70 mole % p-phenylene diamine. The degree of rigidity of the resin, as measured by modulus, will be seen to increase with increasing levels of p-phenylene diamine.

Polyimides based on p-phenylene diamine as the diamine component are known in the art to be generally highly intractable. Most such resins have a very high Tg, well over 500° C. for many such resins, and are generally not melt processable in the imidized form. It is therefore highly surprising in view of the known behavior of these prior art resins that the copolymers of this invention exhibit a significant reduction in Tg compared with the corresponding imide-containing copolymers without p-phenylene diamine, and generally retain good thermal processability.

In most instances the water absorption characteristics of the copolymers of this invention will be reduced over the corresponding copolymers without p-phenylene diamine. This reduction in moisture absorption is particularly surprising inasmuch as replacement of a polynuclear diamine with the lower molecular weight p-phenylene diamine increases the weight fraction of amide and imide groups present in the final polymer; these polar groups are regarded generally as hydrophyllic groups and had been thought to contribute to the affinity of such polymers for moisture.

Preferably, essentially equimolar quantities of diamine and the polycarboxylic acids or their derivatives, e.g., anhydrides, anhydride halides, esters, are employed in preparation of the polyamide-imide copolymer compositions, although an excess of either can be employed and may be useful from the standpoint of controlling product properties such as inherent viscosity. It is contemplated to employ in preparation of the polyamide-imide compositions according to this invention minor amounts of acid or diamine components in addition to those described hereinabove to obtain polymeric compositions comprising recurring units as illustrated hereinabove together with minor amounts of other units. Examples of other acid components that can be employed in such minor amounts include aliphatic and aromatic diacids, such as adipic acid, isophthalic acid, terephthalic acid, 2,6-naphthalene dicarboxylic acid and its esters, phthalic anhydride and the like, while other suitable diamines include hexamethylene diamine, trimethylhexamethylene diamine, 1,12-diaminododecane and similar diamines of the type conventionally used in preparation of polyamides. Combinations of such other acid and diamine components also may be used.

It may also be desirable to include effective amounts, e.g., up to about 10 mole %, generally from about 0.1 to about 10 mole % based on total acid component content, of capping agents such as aniline, phthalic acid, phthalic anhydride or similar monofunctional reagents to provide further control of polyamide-imide molecular weights. Trifunctional or higher polyfunctional reagents such as, for example, trimellitic trichloride or 1,3,5-benzene tricarboxylic acid trichloride can be employed to promote branching.

Usually, reaction of the above-described components is carried out in the presence of a nitrogen-containing, organic, polar solvent such as N-methylpyrrolidone, N,N-dimethylformamide, N,N-dimethylacetamide or combinations thereof. Reaction should be carried out under substantially anhydrous conditions and at a temperature below about 150° C. Most advantageously, the reaction is carried out at about 20° C. to about 70° C. The reaction time is not critical and depends primarily on the reaction temperature. It can vary from about 1 to about 24 hours, preferably, about 2 to about 4 hours at temperatures of about 30° C. to about 70° C. when using nitrogen-containing solvents.

As a result of the reaction there is obtained a relatively viscous solution comprising the imide-containing polymer, typically in predominantly amic acid form, in the reaction solvent. The invented compositions can be recovered from the solution by any suitable means, for example by precipitation with water, and then processed in powder form, pelletized for further processing or re-dissolved in a nitrogen-containing, organic, polar solvent for use in solution processing.

Reaction of components comprising tetracarboxylic acid component, trimellitic acid component and diamine components according to this invention also can be conducted stepwise by reacting all or part of one of the diamine components with an acid component to form an oligomeric product and subsequently reacting that product with the other diamine components and any remaining acid component in one or more additional steps. Preferably, a stoichiometric excess of diamine components is used in relation to the acid component in the first step so that the oligomeric species resulting from the reaction are predominantly amine-terminated and thus capable of further reaction with additional acid component. The first step preferably is conducted in a nitrogen-containing solvent such as identified above at temperatures and for a time sufficient to attain essentially complete reaction of the first acid component with the diamine. More preferably, temperatures of about 20° C. to about 60° C. are employed during the reaction. The products of such a step can then be employed in reaction with the remaining acid component substantially as described hereinabove. When using an excess of one of the acid components relative to the other, best results are achieved when the acid component being used in lower proportion is reacted with diamine in a first step and the product thereof is reacted with the acid component being used in higher proportion in a subsequent step.

Preparation of imide-containing copolymers according to this aspect of the invention allows for substantial flexibility in terms of polymer composition in that longer or shorter oligomeric species can be formed, depending on first step component proportions. The oligomeric species may then be incorporated into the final polymer and, depending on the preparative method, may afford a degree of control over polymer properties such as Tg. In addition, preparation by this technique yields products with the same end groups that are present in conventional polyamide-imides. Accordingly, curing or annealing can be conducted to enhance polymer properties.

Typically, preparation of the imide-containing copolymers in either a single or multiple step process yields products having a substantial amic acid content, e.g., in which there is present a substantial content of structures described hereinabove as amic acid precursors.

Generally, amic acid content is about 50 to about 100 mole percent based on imidizable groups. Acid titre is a convenient indicator of amic acid content, with values of about 1 to about 3 milliequivalents COOH per gram of polymer, indicating a product of significant amic acid content. Conversion of amic acid groups to imide groups can be accomplished by heating, including that conducted during the polymerization or in subsequent processing operations, or chemical means to increase imide content as desired. Conveniently, heating at about 80° C. to about 250° C. is conducted for about 1 to about 20 hours to increase imide content as desired.

The above-described imide-containing compositions of this invention are particularly useful when blended, composited or filled with other materials such as additives, fillers, reinforcing materials, other polymeric resins and combinations thereof.

Blending with other high performance polymeric products, such as polyarylether sulfones, polyetherimides, polyamides, polyphenylene oxide and other polyarylethers, other polyamide-imides, certain polyimides and polyarylene sulfides or combinations thereof can be performed to tailor products to requirements for specific applications. Both miscible and immiscible blends are contemplated, as is the use of compatibilizing agents to enhance miscibility of otherwise immiscible materials. Typically, immiscible blends contain imide and amide-imide components according to the invention as a dominant polymeric resin component if it is desired that properties attributable to such component dominate blend properties. On the other hand, lesser amounts of such polyamide-imide compositions can be used to improve or modify properties of other polymers; accordingly, blends containing such other resins as a dominant component also are contemplated. Miscible blends, also referred to as alloys, comprising the invented compositions and one or more additional polymeric resin components in various proportions also can yield desirable results. Usually, blends are prepared by melt blending of the polymeric components, although dry blending and solution blending can also be conducted in lieu of or to facilitate melt blending. Preferably, due to the high viscosity of the invented compositions at temperatures employed in melt blending, a high shear mixer such as a twin-screw extruder is employed for melt blending.

Filled compositions comprising particulate or fibrous fillers or reinforcing materials embedded in the polyamide-imide copolymer matrix resin are also contemplated. Particulate fillers in the form of fiber, beads, flakes, fibrils, whiskers and the like will be suitable, including glass beads, graphite powder, various mineral fillers such as talc, wollastonite and pumice, resin beads and powdered resins. Suitable fibrous fillers or reinforcing materials include glass, carbon, graphite, boron, aramid and other fibers.

Compositions intended for use in injection molding applications preferably contain up to about 40 weight percent particulate or fibrous materials or a combination thereof because at higher levels the high melt viscosity of the invented polymers together with the viscosity-increasing effect of fibers and particulates make processing difficult. Higher filler levels, e.g., up to about 60 weight percent, are suitable for molding compounds for compression molding, e.g., chopped fiber molding compositions. Filler levels can be increased through use of suitable flow-improvers or processing aids. For injection molding compositions, preferred glass fibers are those made of alkali-free, boron-silicate glass (E-glass) or alkali-containing C-glass, average diameter of the fibers preferably being between about 3 and about 30 microns. It is possible to use both long fibers with an average length of from 5 to 50 millimeters. In principle, any standard commercial-grade fibers can be used.

Composites and prepreg comprising up to 60 wt % continuous fiber may be formed of woven or nonwoven fabric or unidirectional tape or ribbon comprising continuous fibers. Preferably, such fibers have a modulus of at least 8,000,000 psi and are thermally stable to at least 500° F. (260° C.) for at least about ten minutes in order to obtain composites of high strength, the fibers of which resist degradation at temperatures employed in processing, e.g., by compression molding. The term "thermally stable" means the fiber does not emit volatiles to such an extent as to cause voids in the final composite structure. Such thermally stable fibers as silicon nitride, silicon carbide and other ceramic fibers, glass, alumina, boron, Kevlar, graphite, quartz, and carbon fibers are useful as are combinations thereof. Carbon fibers, including graphite fibers, are especially preferred.

For purposes hereof, carbon fibers include graphite fibers as well as amorphous carbon fibers which result after a thermal carbonization or graphitization treatment. Graphite fibers consist substantially of carbon and have a predominant X-ray diffraction pattern characteristic of graphite. Amorphous carbon fibers, on the other hand, are fibers in which the bulk of the fiber weight can be attributed to carbon and which exhibit a predominantly amorphous X-ray diffraction pattern. Graphite fibers generally have a higher Young's modulus than do amorphous carbon fibers and, in addition, are more highly electrically and thermally conductive. A variety of suitable carbon fibers are readily available from commercial sources, including, for example, THORNEL® P-50, P-75, P-100 and P-120 grades of pitch based carbon fiber, as well as T-300, T-500 and T-650/42 grades of polyacrylonitrile-derived carbon fibers available from Amoco Performance Products, Inc.

The improved moisture resistance of the imide-containing copolymers of this invention imparts particularly beneficial property improvements to fiber-filled composites based thereon. More particularly, the imide-containing copolymers of this invention provide unexpected improvements in the hot, wet properties of such composites, increasing the acceptability of such composites for use under particularly stringent environmental conditions.

The practice of this invention will be better understood through consideration of the following examples, which are offered by way of illustration, and not in limitation thereof. The methods of the following Examples are representative of those that may be employed for preparing the resin formulations useful in the practice of this invention, as well as prepreg and composites based thereon, as will be generally recognized by those skilled in the art.

EXAMPLES

Representative examples of imide-containing copolymers according to this invention were prepared and then molded to form specimens for testing. The following procedures are substantially representative of the processes used for all the resins prepared and tested.

Control Example A

Preparation of a
4-TMAC/TMA/BPDA—OBA/m-PDA
(60/10/30—70/30) imide amide-imide copolymer A three-necked, 2-liter reaction flask equipped with stirrer and fitted with a nitrogen purge assembly was charged with 140.2 g (0.70 mol) of oxybis(aniline) (OBA) and 32.4 g (0.30 mol) of m-phenylenediamine (m-PDA). Dry N-methyl pyrrolidone (NMP), 250 ml (dried over molecular sieves), was then added and the mixture was warmed and stirred to a temperature of 50° C. before adding a slurry of 88.3 g (0.30 mol) of biphenyl dianhydride (BPDA) in 120 ml of dry NMP and stirring overnight. A solution of 19.2 g (0.1 mol) of trimellitic anhydride (TMA) in 100 g of dry NMP was then added to the reaction mixture, followed by a solution of 126.3 g (0.60 mol) of 4-trimellitoyl chloride (4-

TMAC) in 250 g of dry NMP, with cooling to maintain the temperature of the reaction vessel within the range of 35°–40° C. The reaction mixture was then warmed to 50° C. and stirred an additional 45 min, then precipitated by pouring into an excess of distilled water in a Waring blender over a 20-minute period. The solid polymer was recovered by filtration, then dispersed in distilled water, allowed to soak overnight, then collected by filtration. This procedure was repeated eight times with soak times of at least one hour. The filtered polymer was air-dried overnight, then dried in a vacuum oven at 60° C. for approximately 48 hr.

The dried polymer had solids content of 89.8 wt % (determined by heating 1.0 g of polymer 20 min at 260° C.), an inherent viscosity of 0.32 dl/g, in NMP (0.5%, 25° C.), and an acid titre of 3.64 meq/g.

A sample of dried polymer, cured by heating 4 hr at 260° C., was compression-molded into 6-inch discs for determination of mechanical properties. The molding was carried out using a Wabash molding press with a circular cavity mold, applying 3500 psig pressure at a temperature 370° C. The part was cooled in the mold and removed from the mold at 120° C.

EXAMPLE 1

Preparation of a
4-TMAC/TMA/BPDA—OBA/p-PDA
(60/10/30—70/30) imide amide-imide copolymer A copolymer of 4-TMAC/TMA/BPDA—OBA/p-PDA (60/10/30—70/30) was prepared substantially by the process of Control Example A, by replacing the m-PDA with the corresponding para- isomer, p-phenylenediamine (p-PDA).

The mechanical properties of the resins are summarized in Table 1. Tensile properties were determined by the procedures of ASTM D-638. Moisture uptake was determined by immersion in distilled water at 71° C. (160° F.) to constant weight.

EXAMPLES 2–5 AND CONTROL EXAMPLES B AND C

Additional examples of imide amide-imide copolymers were prepared and molded into test specimens substantially by following the procedures of Control Example A. The compositions and properties are summarized in Table I.

TABLE I

| | Imide Amide-Imide Copolymers | | | | | | | | |
|---|---|---|---|---|---|---|---|---|---|
| | Anhydride Components | | Diamine Components | | | | | | |
| Ex No. | anhydride (m %) | trimellitic compound (m %) | p-PDA (m %) | aromatic diamine(s) (m %) | T.Str. Kpsi | E % | T.Mod Kpsi | Tg °C. | H$_2$O wt % |
| 1 | BPDA (30) | 4-TMAC (60) TMA (10) | 30 | OBA (70) | 10 | 1.9 | 610 | 250 | — |
| 2 | BPDA (30) | 4-TMAC (70) | 30 | OBA (70) | 13 | 2.9 | 599 | 250 | 2.4 |
| A | BPDA (30) | 4-TMAC (60) TMA (10) | 0 | OBA (70) m-PDA (30) | 15 | 4.3 | 534 | 288 | 3.8 |
| 3 | BPDA (30) | 4-TMAC (70) | 50 | OBA (50) | 15 | 2.1 | 910 | 256 | 2.2 |
| 4 | BPDA (30) | 4-TMAC (70) | 70 | OBA (30) | 15 | 1.6 | 1,060 | 258 | 1.8 |
| B | BPDA (30) | 4-TMAC (60) TMA (10) | 0 | OBA (30) m-PDA (70) | 11 | 1.2 | 570 | 282 | 3.9 |
| 5 | PMDA (35) | 4-TMAC (63) TMA (2) | 50 | BAPP (50) | 9 | 1.9 | 586 | 280 | 2.0 |
| C | PMDA (35) | 4-TMAC (63) TMA (2) | 0 | BAPP (100) | 10 | 3.1 | 416 | 248 | 2.1 |

Notes:
Imide amide-imide copolymer compositions based on substantially equimolar amounts of diamine and polycarboxylic components as described in the Examples; 4-TMAC = 4-trimellitoyl anhydride chloride; TMA = trimellitic anhydride; BPDA = 3,3',4,4'-biphenyl tetracarboxylic acid dianhydride; OBA = oxybis(aniline); p-PDA = p-phenylene diamine; mPDA = m-phenylene diamine; Properties for compression-molded specimens, as molded; T.Str. = tensile strength, T.Mod = tensile modulus, E = elongation, H$_2$O = weight gain. See text for procedures.

In the foregoing Examples 1–4 and the Control Examples A and B, the mechanical properties were determined for as-molded samples, without further heat treatment. Those familiar with high temperature molding resins will recognize that subjecting such resins to further heating in a post-curing operation has been heretofore regarded as desirable in order to attain maximum mechanical properties, and particularly tensile properties. It will be seen from the data presented in Table I for Examples 1–4 that the as-molded mechanical properties of the improved compositions of this invention exhibit substantially greater tensile modulus properties than the as-molded properties of the Control Examples [compare Examples 1 and 2 with A, and Example 4 with B]. The modulus will be seen to increase with increase in the p-PDA diamine content [consider the modulus values for Examples 1–4].

It will also be apparent that the Tg values for the compositions containing p-PDA according to the invention are substantially lower than for the corresponding compositions with m-PDA. As is well-known in the art, polyimides based on p-PDA as the single diamine have very high Tg values, many having Tg values greater than 600° C. and even as great as 900° C. and greater. It is therefore surprising and highly unexpected that substitution of the m-PDA diamine component with p-PDA diamine would provide compositions with reduced Tg.

EXAMPLES 6–12 AND CONTROL EXAMPLES D–G

Imide copolymers comprising p-PDA according to the invention, and control examples without p-PDA were prepared substantially by the process of Control Example A and molded into test specimens. The compositions and properties are summarized in Table II. Also included in the table for comparison purposes are published data for prior art polyimide resins.

TABLE II

Imide Copolymers

| Ex No. | anhydride(s) (m %) | Diamine Components p-PDA m % | aromatic diamine(s) (m %) | T.Str. Kpsi | E % | T.Mod Kpsi | Tg °C. | $H_2O$ wt % |
|---|---|---|---|---|---|---|---|---|
| 6 | BPDA (100) | 50 | 3,4'-OBA (50) | 13 | 1.6 | 870 | 248 | — |
| D | BPDA (100) | 0 | 3,4'-OBA (100) | 16 | 3.4 | 620 | 264 | — |
| 7 | BPDA (65) PMDA (35) | 48.5 | BAPP (48.5) [aniline[1] (6)] | 6 | 1.1 | 590 | 255 | 1.3 |
| E | BPDA (65) PMDA (35) | 0 | BAPP (97) [aniline[1] (6)] | 13 | ⁻3.8 | 386 | 250 | 1.3 |
| 8 | OPAN (100) | 30 | OBA (70) | 18 | 21.7 | 526 | 266 | 2.3 |
| F | OPAN (100) | 0 | OBA (70) m-PDA (30) | 18 | 24.7 | 484 | 272 | 3.7 |
| 9 | OPAN (100) | 50 | OBA (50) | 19 | 5.0 | 665 | 264 | 1.7 |
| 10 | OPAN (100) | 50 | 1,3,3-APB (50) | 9 | 19.4 | 654 | 198 | 1.2 |
| G | OPAN (100) | 0 | 1,3,3-APB (50) m-PDA (50) | 5 | 1.0 | 543 | 181 | 1.0 |
| 11 | IPAN (100) | 50 | OBA (50) | 19 | 19.3 | 470 | — | — |
| X[2] | OPAN (100) | 100 | — | 27[2] | 4[2] | 975[2] | none[2] | 5.1[2] |
| Y[3] | BPDA (100) | 100 | — | — | — | 1,500[3] | >500[3] | — |

Notes:
Polyimide compositions based on substantially equimolar amounts of diamine and polycarboxylic components as described in the Examples; BPDA = 3,3',4,4'-biphenyl tetracarboxylic acid dianhydride; OPAN = oxybisphthalic anhydride; PMDA = pyromellitic dianhydride; IPAN = Isopropylidene-bisphthalic anhydride; 1,3,3-APB = 1,3-bis(3-aminophenoxy)benzene; OBA = oxybis(aniline); p-PDA = p-phenylene diamine; m-PDA = m-phenylene diamine; Properties for compression-molded specimens, as molded; T.Str. = tensile strength, T.Mod = tensile modulus, E = elongation, $H_2O$ = weight gain. See text for procedures.
1. Aniline added to control MW -- see text.
2. Prior art resin; property data are published values.
3. Upilex S polyimide from Ube Industries; property data are published values.

It will be apparent from a consideration of the data for the imide copolymers of Table II that copolymers wherein the diamine component comprises in part p-PDA exhibit a substantial increase in rigidity as represented by the modulus values [compare Examples 6 with D, and 7 with E]. The effect is not seen when the added diamine is m-PDA [compare Examples 8 with F, and 10 with G]. It will also be seen that the addition of p-PDA effects a surprising reduction in Tg. That the reduction is surprising is further affirmed by consideration of the properties of the prior art polyimides of Control Example X, a very rigid resin having a crystal melting point Tm of 724° C. and no measurable Tg, and of Control Example Y, a highly rigid resin having a Tg>550° C. Both resins comprise only p-PDA as the diamine component.

EXAMPLE 12

Preparation of a 4-TMAC/TMA—OBA/p-PDA (94.5/5.5—70/30) amide-imide copolymer

A copolymer of 4-TMAC/TMA—OBA/p-PDA (94.5/5.5—70/30) was prepared substantially by the process of Control Example A, omitting the BPDA component, and molded into test specimens. The mechanical properties were determined as follows:
Tensile Str. (Kpsi): 8.
Elongation (%): 1.3.
Tensile Mod. (Kpsi): 685.
Tg(°C.): 250°.
$H_2O$ (wt %): 2.2.

CONTROL EXAMPLE H

Preparation of a 4-TMAC/TMA—OBA/m-PDA (94.5/5.5—70/30) amide-imide copolymer

A copolymer of 4-TMAC/TMA—OBA/m-PDA (94.5/5.5—70/30) was prepared substantially by the process of Control Example A, omitting the BPDA component, and molded into test specimens. The mechanical properties were determined as follows:

Tensile Str. (Kpsi): 8.
Elongation (%): 1.6.
Tensile Mod. (Kpsi): 547.
Tg(°C.): 284°.
$H_2O$ (wt %): 4.5.

It will be seen from a comparison of the properties of the amide-imide copolymer of Example 12, comprising p-PDA in the diamine component with those of the equivalent copolymer of Control Example H, made with diamine component comprising m-PDA, that the rigidity of the resin, as represented by tensile modulus properties, is substantially increased for copolymers with p-PDA while the Tg is again significantly lowered. As with the imide-containing copolymers of Examples 1-11, these differences are unexpected and surprising.

The invention will thus be seen to be improved imide-containing copolymer compositions comprising aromatic polycarboxylic acid components and aromatic diamine components wherein the diamine component comprises p-phenylene diamine and at least one additional aromatic diamine. The imide-containing copolymers of this invention may be further characterized as derived from the polymerization of at least one aromatic tetracarboxylic acid compound, at least one polynuclear aromatic diamine and p-phenylene diamine. The imide-containing copolymers may further comprise amide-imide units, including amic acid precursors thereof, the aforesaid amide-imide units derived by including in the polymerization a trimellitic acid component. The imide-containing copolymers of this invention may be comprised essentially of amide-imide units, including amic acid precursors thereof, derived from the polymerization of a trimellitic acid component, at least one polynuclear aromatic diamine and p-phenylene diamine. The aforesaid trimellitic acid component in each instance will comprise at least one trimellitic acid compound.

The compositions according to this invention will exhibit greater rigidity than corresponding compositions omitting p-phenylene diamine component, and thus the invention may also be described and characterized as a method for increasing the rigidity of imide-containing polymers comprising the step of forming an imide-containing copolymer comprising in the diamine component thereof from about 10 to about 90 mole %, preferably from about 10 to about 70 mole %, p-phenylene diamine, the balance of the diamine component comprising at least one additional aromatic diamine. The rigidity of the imide-containing copolymers of this invention will be substantially increased, while the Tg will be surprisingly lowered, and the improved imide-containing copolymers of this invention will be thus useful in the production of molded articles, coatings, laminates and composite materials for applications requiring good thermal processability together with a high level of rigidity as represented by tensile modulus. The copolymers of the invention generally exhibit low moisture absorption, and have good retention of mechanical properties at elevated temperatures after exposure to humid environments. The compositions of this invention have been set forth and characterized by the way of examples which are provided by way of illustration and not in limitation. The polyamide-imide resins of this invention may further include one or more of the variety of stabilizers, fillers, dyes, pigments, plasticizers, processing aids and the like commonly employed in the art for such compositions, as will be recognized by those skilled in the art. Such additions and modifications will therefore be considered as being within the scope of the invention, which is defined by the appended claims.

We claim:

1. An imide-containing copolymer formed from an aromatic polycarboxylic acid component and an aromatic diamine component, said aromatic polycarboxylic acid component comprising at least one polycarboxylic acid compound selected from the group consisting of aromatic tetracarboxylic acid compounds and trimellitic acid compounds, and said aromatic diamine component comprises from about 10 to about 70 mole % p-phenylene diamine and correspondingly from 90 to about 30 mole % of at least one additional aromatic diamine.

2. The copolymer of claim 1 wherein the diamine component comprises from about 10 to about 90 mole % p-phenylene diamine.

3. The copolymer of claim 1 wherein the said additional aromatic diamine is selected from the group consisting of 4,4'-diaminodiphenyl sulfone, 4,4'-diaminodiphenyl ether, 1,3-bis(3-aminophenoxy)benzene, oxy-bis-aniline, 4,4'-bis(aminophenyl)methane, 4,4'-diaminobenzophenone, 2,2-bis(4-(p-aminophenoxy) phenyl)propane, 2,2-bis(3,5-dichloro-4-(p-aminophenoxy)phenyl)propane, 2,2-bis(4-(p-aminophenoxy)phenyl)hexafluoropropane, 2,2-bis(4-(m-aminophenoxy)phenyl)hexafluoropropane, 2,2-bis(4-(m-(aminophenoxy)phenyl)propane, 2,2-bis(4-aminophenoxy) biphenyl, 2,2-bis(4-p-aminophenoxy)phenyl ether, 2,2-bis(4-m-aminophenoxy) benzophenone, m-phenylene diamine and diamino-toluene.

4. The copolymer of claim 1 wherein the polycarboxylic acid component comprises at least one aromatic tetracarboxylic acid compound.

5. The copolymer of claim 1 wherein the polycarboxylic acid component comprises at least one aromatic tetracarboxylic acid compound and at least one trimellitic acid compound.

6. An imide-containing copolymer formed from an aromatic polycarboxylic acid compound selected from the group consisting of aromatic tetracarboxylic acid compounds, trimellitic acid compounds and mixtures thereof and an aromatic diamine component comprising from about 10 to about 70 mole % p-phenylene diamine and correspondingly from 90 to about 30 mole % of at least one additional diamine, said additional diamine selected from the group consisting of 4,4'-diaminodiphenyl sulfone, 4,4'-diaminodiphenyl ether, 4,4'-bis(aminophenyl) methane, 1,3-bis(3-aminophenoxy)benzene, 4,4'-diamino-benzophenone, 2,2-bis(4-(p-aminophenoxy)phenyl) propane, 2,2-bis(3,5-dichloro-4-(p-aminophenoxy) phenyl) propane, 2,2-bis(4-(p-aminophenoxy)phenyl) hexafluoro-propane, 2,2-bis(4-(m-aminophenoxy) phenyl) hexafluoropropane, 2,2-bis(4-(m-(aminophenoxy)phenyl) propane, 2,2-bis(4-aminophenoxy) biphenyl, 2,2-bis(4-p-aminophenoxy) phenyl ether, 2,2-bis(4-m-aminophenoxy) benzophenone, m-phenylene diamine and diamino-toluene.

7. The copolymer of claim 6 wherein said aromatic polycarboxylic acid component is selected from the group consisting of pyromellitic dianhydride, diphenyl ether tetracarboxylic acid dianhydride, benzophenone tetracarboxylic acid dianhydride, diphenyl sulfone tetracarboxylic acid dianhydride, biphenyl tetracarboxylic acid dianhydride, trimellitic acid, trimellitic anhydride, trimellitic anhydride dimer, trimellitoyl anhydride chloride, trimellitoyl anhydride bromide and trimellitoyl anhydride iodide.

8. The copolymer of claim 6 wherein said aromatic polycarboxylic acid component comprises at least one aromatic tetracarboxylic acid compound selected from the group consisting of pyromellitic dianhydride, diphenyl ether tetracarboxylic acid dianhydride, benzophenone tetracarboxylic acid dianhydride, diphenyl sulfone tetracarboxylic acid dianhydride, and biphenyl tetracarboxylic acid dianhydride.

9. The copolymer of claim 6 wherein said aromatic polycarboxylic acid component comprises at least one trimellitic acid compound selected from the group consisting of trimellitic acid, trimellitic anhydride, trimellitic anhydride dimer, trimellitoyl anhydride chloride, trimellitoyl anhydride bromide and trimellitoyl anhydride iodide.

10. In an imide-containing copolymer comprising aromatic polycarboxylic acid component and aromatic diamine component, said acid component comprising at least one polycarboxylic acid compound selected from the group consisting of aromatic tetracarboxylic acid compounds and trimellitic acid compounds, the improvement wherein said aromatic diamine component comprises p-phenylene diamine and at least one additional aromatic diamine.

11. A method for increasing the rigidity of an imide-containing copolymer comprising units derived from an aromatic polycarboxylic acid component comprising at least one polycarboxylic acid compound selected from the group consisting of aromatic tetracarboxylic acid compounds and trimellitic acid compounds, and an aromatic diamine component, said method comprising the step of providing an aromatic diamine component of from about 10 to about 70 mole % p-phenylene diamine and correspondingly from about 90 to about 30 mole % of at least one additional aromatic diamine.

12. The method of claim 11 wherein said additional aromatic diamine is selected from the group consisting of 4,4'-diaminodiphenyl sulfone, 4,4'-diaminodiphenyl ether, 4,4'-bis(aminophenyl) methane, 1,3-bis(3-aminophenoxy)benzene, 4,4'-diaminobenzophenone, 2,2-bis(4-(p-aminophenoxy)phenyl) propane, 2,2-bis(3,5-dichloro-4-(p-aminophenoxy) phenyl) propane, 2,2-bis(4-(p-aminophenoxy)phenyl) hexafluoropropane, 2,2-bis(4-(m-aminophenoxy) phenyl) hexafluoropropane, 2,2-bis(4-(m-(aminophenoxy)phenyl) propane, 2,2-bis(4-aminophenoxy) biphenyl, 2,2-bis(4-p-aminophenoxy) phenyl ether, 2,2-bis(4-m-aminophenoxy) benzophenone, m-phenylene diamine and diamino-toluene.

13. The method of claim 11 wherein said additional aromatic diamine is selected from the group consisting of 4,4'-diaminodiphenyl ether, 3,4'-diaminodiphenyl ether, m-phenylene diamine 2,2-bis(4-(m-(aminophenoxy) phenyl) propane, 2,2-bis(4-aminophenoxy) biphenyl, 2,2-bis(4-p-aminophenoxy) phenyl ether, 3,3',4,4'-biphenyl tetracarboxylic acid dianhydride and 1,3-bis(3-aminophenoxy)benzene.

* * * * *